3,142,707
METHOD FOR THE PREPARATION OF ETHYLATED DECABORANES
Clayton O. Obenland, Hamden, Conn., assignor to Olin Mathieson Chemical Corporation, a corporation of Virginia
No Drawing. Filed Dec. 2, 1960, Ser. No. 73,457
2 Claims. (Cl. 260—606.5)

This invention relates to a method for the preparation of ethylated decaboranes by reacting an ethyl halide with decaborane in the presence of boron trichloride as a catalyst.

Copending application Serial No. 497,407, filed March 28, 1955, of Elmar R. Altwicker et al., issued as U.S. Patent No. 2,999,117 on Sept. 5, 1961, describes the preparation of alkylated decaboranes by reacting an alkyl halide with decaborane in the presence of an alkylation catalyst such as aluminum chloride. In order to produce a product having a high proportion of monethyldecaborane, however, it was found that the reaction should be quenched at the desired point by adding water to destroy the catalyst or by limiting the amount of ethylating agent and employing a hydrocarbon solvent such as n-pentane. In adapting the reaction to relatively large scale continuous operation, it would be desirable to avoid the introduction of water into the processing sequence and to avoid the use of a solvent in order to minimize reaction equipment size.

It has now been found that the ethylation of decaborane by reaction of an ethyl halide with decaborane will proceed satisfactorily in the presence of boron trichloride as a catalyst with yields of ethylated product, conversion of decaborane and product distribution among the various ethyl derivatives approaching those obtained when aluminum chloride is employed as the catalyst and n-pentane is employed as the solvent.

The method of this invention is illustrated in detail by the following examples:

EXAMPLE 1

The apparatus employed consisted of a stainless steel pressure vessel equipped with a condenser, two 0–200 p.s.i. gauges, one positioned above and one below the condenser, a rupture disk assembly positioned below the condenser to relieve sudden excessive pressure buildup, and a throttling valve positioned above the condenser for venting gas pressure to a hydrogen chloride absorber. The condenser was cooled to a temperature of about −15 to −20° C., i.e., low enough to minimize the escape of ethyl chloride with the hydrogen chloride evolved during the alkylation. The total volume of the system was 1020 milliliters.

Into the pressure vessel containing an internal magnetized rod stirrer were charged 1 gram mole of decaborane, 4 gram moles of ethyl chloride and 0.25 gram mole of boron trichloride. The pressure vessel was attached to the system and the throttling valve was closed. The pressure vessel was then immersed in a stirred silicone oil bath which had been preheated to 90° C. by an immersion heater regulated by a temperature controller and stirring was begun. As heating and reaction took place, the pressure increased slowly and at a pressure of 90 p.s.i.g., the throttling valve was opened slightly, relieving gas pressure through the hydrogen chloride absorber. The valve was then adjusted to maintain a pressure of about 93 p.s.i.g. throughout the reaction period of 70 minutes.

At the expiration of the reaction time, the throttling valve was closed and the pressure vessel removed from the oil bath. It was then cooled by immersion in cold water. When the pressure vessel had been cooled to room temperature, any residual pressure was released through the HCl scrubber in order to collect hydrogen chloride. Subsequently the water from the scrubbers was titrated with standard sodium hydroxide to determine the amount of hydrogen chloride absorbed.

The pressure vessel was then detached from the system and the chloride solution was distilled under reduced pressure to remove the ethyl chloride and the boron trichloride. The residual material, crude product and unreacted decaborane, was slurried with about 500-ml. of n-pentane. After cooling the solution to Dry Ice temperature, the precipitated decaborane was filtered, leaving the crude product in the n-pentane. This procedure was repeated. The crude product was then separated by distillation of the n-pentane under reduced pressure. Finally the product was heated to 95° C. at 15 mm. to insure removal of solvent.

The amount of unreacted decaborane in the separated solids was determined by infrared analysis. The crude product was analyzed mass spectrometrically to determine composition in terms of weight percent of monoethyl, diethyl, and triethyldecaborane and decaborane. With the data thus obtained, the conversion of decaborane and the theoretical amount of hydrogen chloride liberated were calculated.

The pertinent data from this and other examples are presented in Table I.

Various modifications can be made in the procedures of the specific examples. Thus in place of ethyl chloride, ethyl bromide or ethyl iodide can be used. The relative proportion of ethyl halide to decaborane is generally within the range of 1 to 6 moles of ethyl halide per mole of decaborane, the reaction temperature generally ranges from about 50° to 150° C., and the reaction time varies from one-half to 10 hours. Since boron trichloride is relatively volatile, the reaction is carried out under superatmospheric pressures sufficient to maintain the boron trichloride in liquid phase, i.e., pressures of 50 up to about 200 p.s.i.g. depending upon the reaction temperature. The proportion of boron trichloride catalyst can vary widely but in general ranges from about 0.1 to 10 moles of boron trichloride per mole of decaborane.

Table I

| Ex. No. | Reactants—Molar Ratios | | | Reaction Conditions | | | Moles of HCl Evolved | | Conversion (on Prod.), Percent | Weight of Product, g. | Composition of Product, Weight Percent | | | |
|---|---|---|---|---|---|---|---|---|---|---|---|---|---|---|
| | $B_{10}H_{14}$ | $C_2H_5Cl$ | $BCl_3$ | Press., p.s.i.g. | Temp., ° C. | Time, Min. | Meas. | Calc. | | | $B_{10}H_{14}$ | EtD[a] | $Et_2D$[b] | $Et_3D$[c] |
| 1 | 1 | 4 | 0.25 | 93 | 90 | 70 | 0.36 | 0.27 | 22.9 | 38 | 6.2 | 75.3 | 15.7 | 2.8 |
| 2 | 1 | 4 | 0.25 | 95 | 90 | 65 | 0.51 | 0.60 | 44.1 | 74 | 4.4 | 61.0 | 29.3 | 5.2 |
| 3 | 1 | 4 | 0.25 | 96 | 90 | 105 | 0.45 | 0.55 | 41.8 | 67 | 0.9 | 66.9 | 27.7 | 4.5 |
| 4 | 1 | 6.4 | 0.2 | 0 | 17 | 300 | none | | | none | | | | |

[a] EtD = Monoethyl decaborane.
[b] $Et_2D$ = Diethyl decaborane.
[c] $Et_3D$ = Triethyl decaborane.

I claim:

1. A method for the preparation of an ethylated decaborane which comprises reacting at a temperature of about 50° to 150° C. decaborane and an ethyl halide selected from the class consisting of ethyl chloride, ethyl bromide and ethyl iodide while the reactants are in admixture with boron trichloride.

2. The method of claim 1 wherein the ethyl halide is ethyl chloride.

No references cited.